US006952585B1

(12) United States Patent
Shi

(10) Patent No.: US 6,952,585 B1
(45) Date of Patent: Oct. 4, 2005

(54) MULTI-CHANNEL COMMUNICATION SYSTEM FOR WIRELESS LOCAL LOOP COMMUNICATION

(75) Inventor: Hong Shi, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 1164 days.

(21) Appl. No.: 09/026,936

(22) Filed: Feb. 20, 1998

Related U.S. Application Data

(60) Provisional application No. 60/066,181, filed on Nov. 19, 1997.

(51) Int. Cl.⁷ .................................................. H04Q 7/20
(52) U.S. Cl. .................. 455/452.1; 370/334; 455/562.1
(58) Field of Search .............................. 455/450, 451, 455/452, 453, 561, 562, 554, 555, 231, 272, 273, 423, 422, 130, 131, 132, 133; 370/328, 334, 336, 337

(56) References Cited

U.S. PATENT DOCUMENTS

| | | | | |
|---|---|---|---|---|
| 4,747,160 A | * | 5/1988 | Bossard | 455/33 |
| 5,592,490 A | * | 1/1997 | Barratt | 370/310 |
| 5,745,841 A | * | 4/1998 | Reudink | 455/62 |
| 5,832,389 A | * | 11/1998 | Dent | 455/562 |
| 5,886,988 A | * | 3/1999 | Yun | 370/329 |
| 5,905,950 A | * | 5/1999 | Anell | 455/421 |
| 5,914,946 A | * | 6/1999 | Avidor | 370/336 |
| 5,915,212 A | * | 6/1999 | Przelomiec | 455/83 |
| 5,920,813 A | * | 7/1999 | Evans | 455/422 |

OTHER PUBLICATIONS

EP O 156,335 A, Standard Electrik Lorenz, Nachrichtenubertragungssytem, Oct. 2, 1985, p. 1, line 1—line 9, claims 1,5.
EP O 150,399 A, Licentia GMBH, Digitales Zellenfunksystem mit Zeitmultiplex, Aug. 7, 1985, p. 4, line 16—p. 5, line 9, claim 1.
WO 97 12489 A, Pacific Comm Sciences Inc., Time Sharing Method and Apparatus for Frequency Reuse in Cellular Communication Systems, Apr. 3, 1997, p. 2, line 15–22.
EP O 720,405 A, AT & T Corp., Multilple–access Cellular Communication with Dynamic Slot Allocation and Reduced Co–chanell Interference, Jul. 3, 1996, p. 7, line 33—line 48, figures 8a and 8b.
European Patent Office, PCT International Search Report, Feb. 15, 1999.

* cited by examiner

Primary Examiner—Nick Corsaro
(74) Attorney, Agent, or Firm—Myers Bigel Sibley & Sajovec

(57) ABSTRACT

The present invention discloses novel methods of communication for wireless local loop communication systems. The method comprises the steps of providing a plurality of fixed access units in radio communication with an array of radio fixed parts; utilizing a plurality of radio channels divided into a predetermined number of synchronized time slots; conducting radio communication between an activated fixed access unit and an activated radio fixed part during a chosen time slot on an assigned radio channel; and denying radio communication on said assigned radio channel during said chosen time slot in a controlled number of radio fixed parts surrounding said activated radio fixed parts.

23 Claims, 6 Drawing Sheets

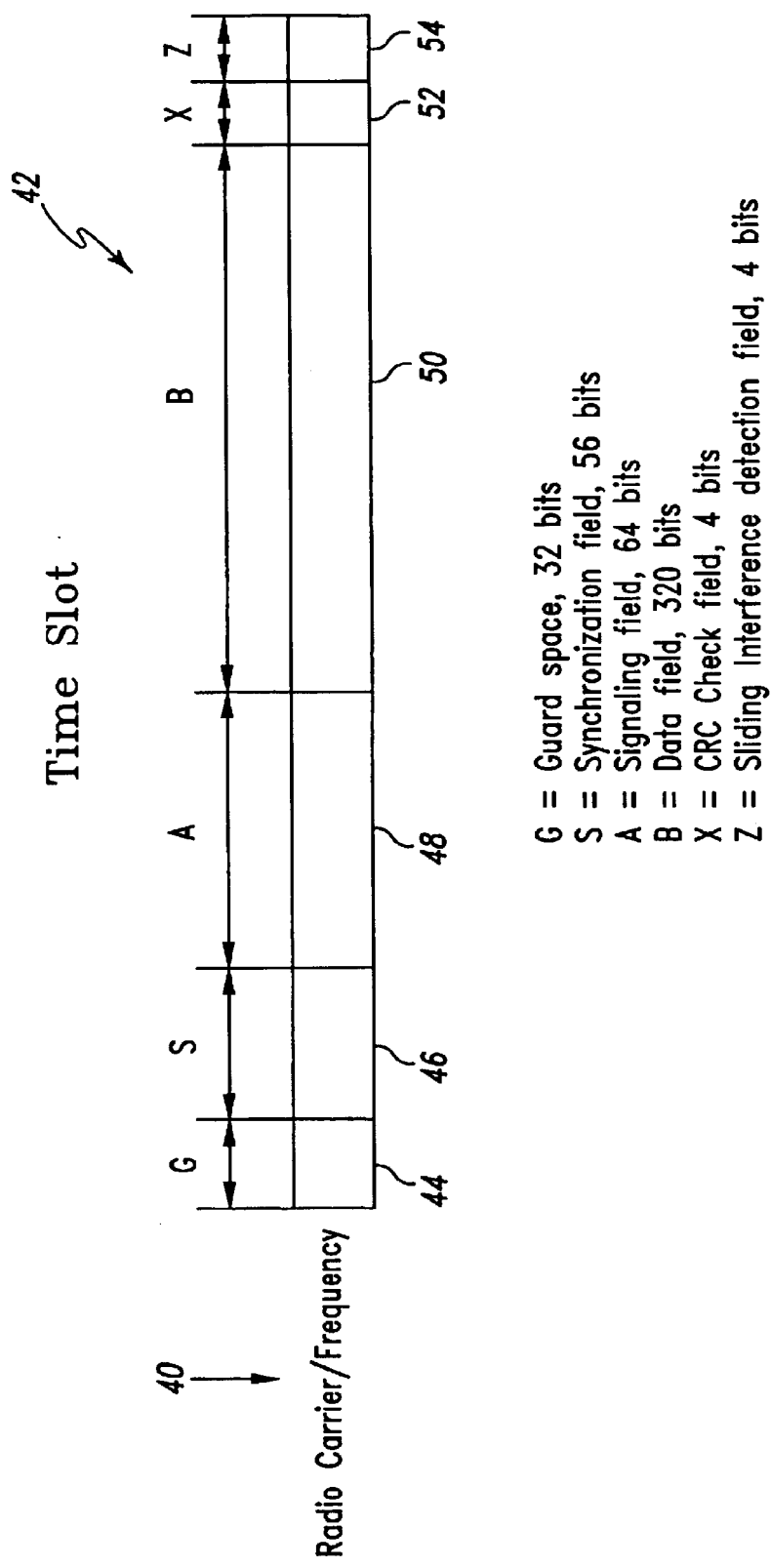

MULTI-CHANNEL COMMUNICATION SYSTEM FOR WIRELESS LOCAL LOOP COMMUNICATION

This application claims the benefit under 35 U.S.C. §119(e) of Provisional U.S. patent application Ser. No. 60/066,181 filed on Nov. 19, 1997.

BACKGROUND OF THE INVENTION

1. Field of Invention

The present invention relates to a novel method of communication for wireless local loop communication systems and, more particularly, to methods for optimally handling radio transmission and reception in a radio access node thereby minimizing internal interference and blocking problems.

2. The Prior Art

Cellular systems operate on the principle of frequency reuse which gives a cellular operator the ability to offer high radio traffic capacity. With higher radio traffic capacities, more users per geographic area are able to utilize radio communication. Frequency reuse, which is a core concept in cellular communication, involves reusing the same frequency in a system many times over to handle multiple calls. Time-division multiple access ("TDMA") is a form of access technology that allows multiple users to occupy the same frequency spectrum. Each user of the cellular system shares the frequency allocation with other users who have time slot allocation during other periods.

In a wireless local loop communication system utilizing the TDMA standard of cellular communication, many users share the same frequency channel, each user being allocated a unique time slot. As traffic increases within each random access node, or cell site, the level of internal interference and signal blocking that occurs rises due to the amount of users utilizing the same frequency carriers and same time slot in the neighboring frequency carriers. When a fixed access unit, or a mobile station for that matter, is engaged in a call, the user will experience communication quality problems as various different factors affect the quality of the communication system, such as internal interference, blocking, load, multipath propagation, scattering and reflection. Therefore, a need exists for methods that will reduce any of the problems associated with the quality of calls.

Prior low-tier PCS communication systems have attempted to solve the problem of internal system interference and blocking by using dynamic channel allocation. In order to maintain the quality of radio communication within the cellular network, a fixed access unit, or mobile unit, will scan the operating environment and select all available channels. The scan result is then loaded in a history table in the order of its quality. The history table is updated at different time intervals to constantly monitor the condition of the various channels available for use. If a handset or mobile unit starts experiencing interference, fading, or receiving a stronger signal from another base station during the call, the mobile unit will dynamically switch to a better channel based on the information contained within its history table.

In a wireless local loop communication system, the distance between a radio access node and a fixed access unit is much larger than the operating range of a business wireless system. A radio access node and a fixed access unit can be up to 3000 meters apart whereas in a business wireless system, the radio access node and fixed access units are usually up to 300 meters apart. The local channel condition can be quite different for a fixed access unit in these two systems because of the interference and blocking problems experienced by the radio fixed part. A channel sensed by the fixed access unit as a good channel might be a bad channel for a radio fixed part. A dynamic channel allocation system cannot tell the difference in channel quality and, hence, it will not effectively solve the problems associated with internal interference and blocking. As a result of this problem, the capacity of the cellular system is dramatically deteriorated as traffic rises. Therefore, a need exists for a method of system channel planning that will effectively solve the problems associated with internal interference and blocking in a wireless local loop.

SUMMARY OF THE INVENTION

The present invention solves the problems associated with internal interference and blocking by providing a method of system operation for wireless local loop communication systems. The invention discloses a method of communication in a wireless local loop system, comprising the steps of providing an array of radio fixed parts for radio communication with a plurality of fixed access units. The system is then supplied with a plurality of indexed radio frequencies that are divided into a plurality of synchronized time slots. In the invention, an activated radio fixed part and an activated fixed access unit are utilized for radio communication in an assigned time slot on a selected indexed radio frequency.

In order to reduce internal interference and blocking, the system may deny radio communication, which is either radio transmission or radio reception, in a selected time slot on an assigned radio channel in a predetermined number of radio fixed parts surrounding the activated radio. The system can be capable of denying both radio transmission and radio reception in their selected time slots on the assigned frequency carrier in the predetermined number of radio fixed parts that are capable of interfering with the radio communication in the assigned time slots. The predetermined number of radio fixed parts surrounding said activated radio parts may comprise the adjacent radio fixed parts. In addition, radio transmission in the second adjacent radio fixed part and the back-to-back radio fixed parts may be disallowed. Likewise, in order to minimize internal interference during reception of a radio signal being received from an activated fixed access unit, radio reception may be disallowed in the adjacent radio fixed part, the second adjacent radio fixed part, and all other radio fixed parts.

After the activated radio fixed part and the activated fixed access unit terminate radio communication, the assigned time slot on said selected indexed radio frequency is once again made available for radio communication. In order to conduct radio communication, an indexed upper frequency band may be utilized to transmit signals from the array of radio fixed parts to said plurality of fixed access units. Correspondingly, a lower frequency band may be used to transmit signals from said plurality of fixed access units to said array of radio fixed parts. Other embodiments of the present invention can utilize one of the indexed radio frequencies to handle two-way communication between said activated fixed access unit and said activated radio fixed part.

Other features and advantages of the invention will be apparent from the drawings and the more detailed description of the invention that follows.

BRIEF DESCRIPTION OF THE DRAWINGS

FIG. 2 is a diagrammatic breakdown of a time slot which is fundamental in TDMA radio communication.

DETAILED DESCRIPTION OF THE INVENTION

The present invention discloses a novel method of system operation in a wireless local loop communication system that will maintain internal radio interference and blocking at acceptable, nominal levels. This method provides greater quality, flexibility and capacity in wireless local loop networks thereby eliminating the problems associated with the prior art. The present invention provides a method of operating multi-channel wireless local loop communication systems; therefore, it is important to have a basic understanding of how such wireless local loop communication systems operate.

A wireless local loop communication system can vary from location to location, depending on the needs of the system. For instance, a wireless local loop communication system utilized in a rural setting is different from those utilized in a densely populated urban area. The present invention provides a method of system operation for wireless local loop communication systems that allows multiple users to access the system while maintaining internal interference and blocking levels low enough to not affect radio communication. A person of ordinary skill in the art of radio communications would recognize that the disclosed method can be adapted to many wireless networks thereby increasing the quality of those systems as well.

Figure 1:
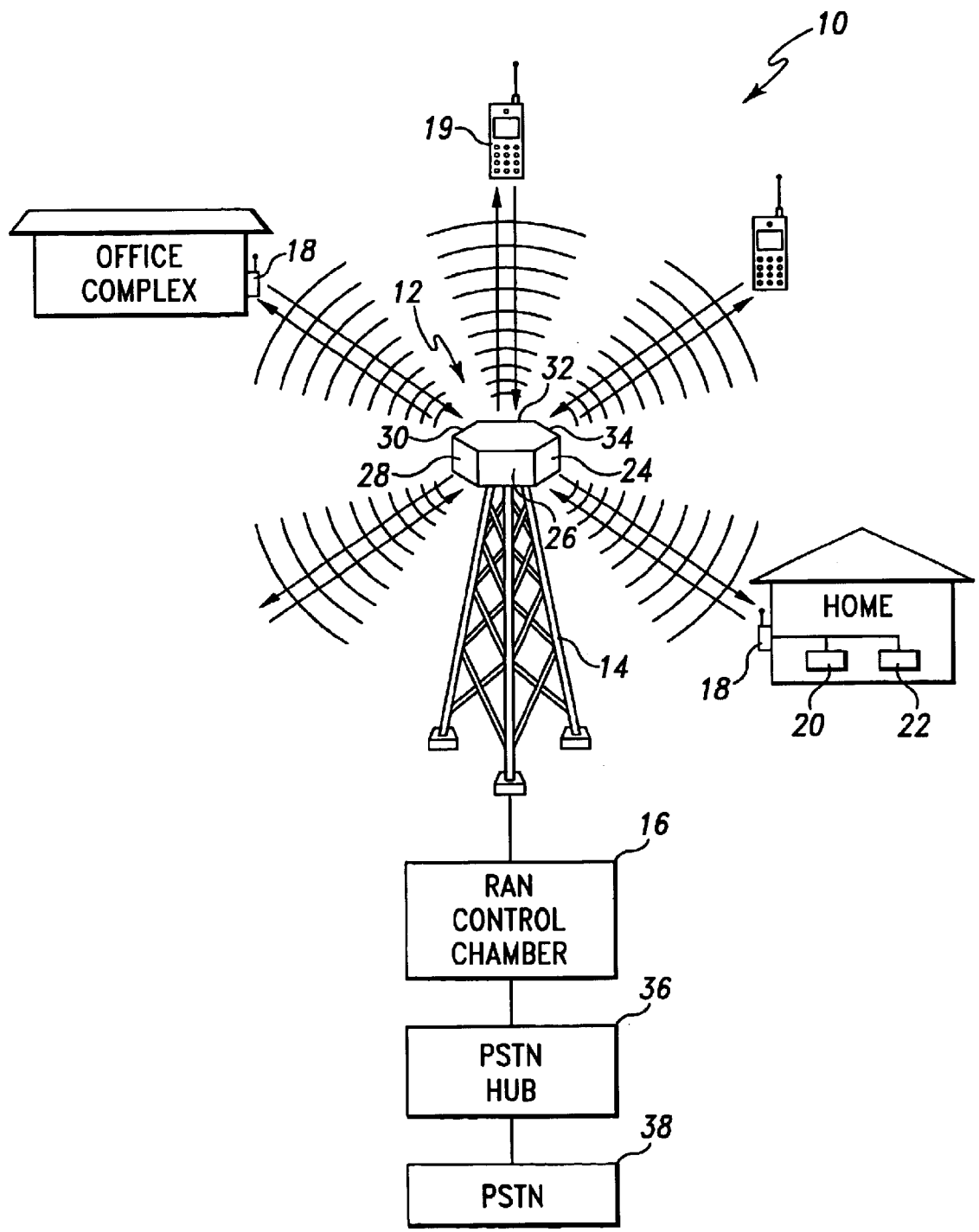
FIG. 1 is a diagrammatic representation of a preferred embodiment of a wireless local loop communication system.

In FIG. 1, the basic design of a wireless local loop communication system 10 is illustrated that could be utilized to conduct radio communication with a plurality of users. As illustrated, a radio access node ("RAN") 12, which may be positioned on a tower 14 above the ground, is connected with a RAN control chamber 16. The RAN 12 is responsible for transmitting and receiving radio signals from any communication device that may be connected with the wireless local loop communication system 10, utilizing one of several standardized communication protocols. In a wireless local loop communication system 10, radio communication is conducted between the RAN 12 and a plurality of fixed access units 18 that are connected with a home or business. The plurality of fixed access units 18 can be connected with a variety of communication devices, including but not limited to a telephone 20, a modem 22, a fax machine or any other communication device that is capable of conducting communication. One skilled in the art should recognize that portable phones can also conduct radio communication with the RAN 12 and reference to fixed access units 18 should be viewed as encompassing portable phones and all other types of units that are adapted for radio communication.

Figure 1A:
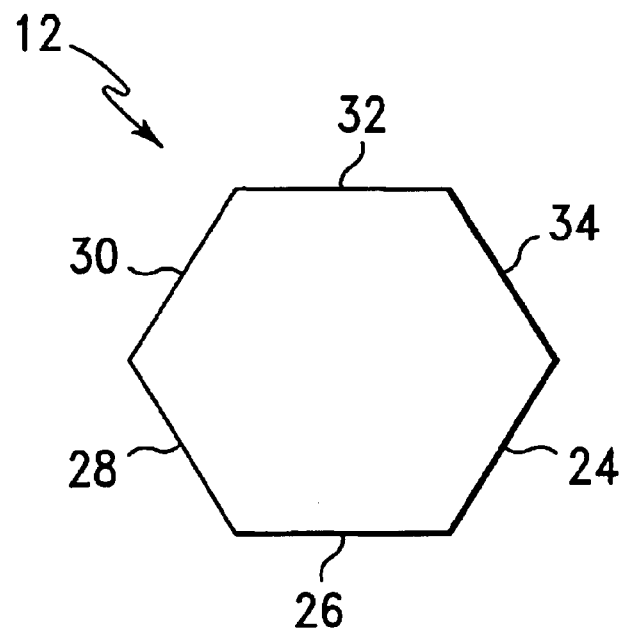
FIG. 1A is a diagrammatic representation of a radio access node having six radio fixed parts.
Figure 1B:
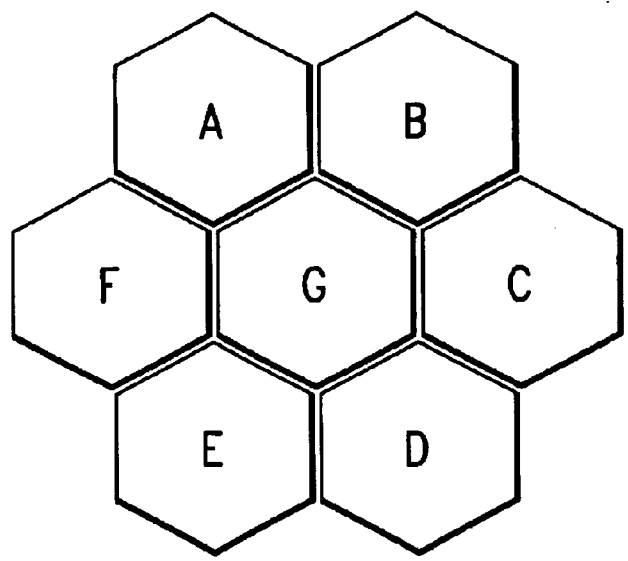
FIG. 1B is a diagrammatic representation of an array of radio access nodes.

The RAN 12 comprises a plurality of radio fixed parts 24, 26, 28, 30, 32 and 34 which are responsible for transmitting and receiving radio signals used by the various communication devices connected with the wireless local loop communication system. The plurality of radio fixed parts 24, 26, 28, 30, 32 and 34 are arranged in a geometric array so that they cover 360 degrees of rotation in a horizontal plane. As illustrated in FIG. 1A, an array of six radio fixed parts 24, 26, 28, 30, 32 and 34 have been utilized to create the RAN 12. An array of radio fixed parts can be made from 6, 12, 18 or more radio fixed parts and the disclosure of six is for reference only and is by no means meant as a limitation. As depicted in FIG. 1B, a plurality of RANs 12 can be used to create wider cover area.

In order to allow users of the wireless local loop communication system 10 to communicate with the public, the RAN control chamber 16 is connected with a public switched telephone network hub 36. The public switched telephone network hub 36 is connected with the public switched telephone network (PSTN) 38 and allows users of the wireless local loop communication system 10 to communicate with anyone connected with the public telephone networks. The RAN control chamber 16 is usually located near the RAN 12 and is responsible for controlling the transmission and reception of radio signals between the RAN 12 and the plurality of fixed access units 18. The RAN control chamber 16 is also responsible for controlling communication between a user on the wireless local loop communication system 10 and the public switched telephone network 38.

In order to conduct radio communication between the plurality of radio fixed parts 24, 26, 28, 30, 32 and 34 and the plurality of fixed access units 18, a standard digital communication protocol must be chosen. In preferred embodiments of the present invention, the novel method of communication will operate on systems using time-division multiple access ("TDMA") as the standard communication protocol. TDMA is a well-known access technology that allows multiple users to occupy the same channel through the use of time division. The standard TDMA format utilized by the United States is the IS-54 standard and is referred to as the North American dual mode cellular format. In the United States, the Federal Communications Commission has allocated a block of radio frequency from 1850–1990 MHz known as the PCS band. The upper frequency band ranges from 1930–1990 MHz and the lower frequency band ranges from 1850–1910 MHz for digital cellular communication. The European standard for digital cordless telephony using the TDMA format is commonly referred to as the Digital European Cordless Telecommunications ("DECT") standard.

Figure 3:
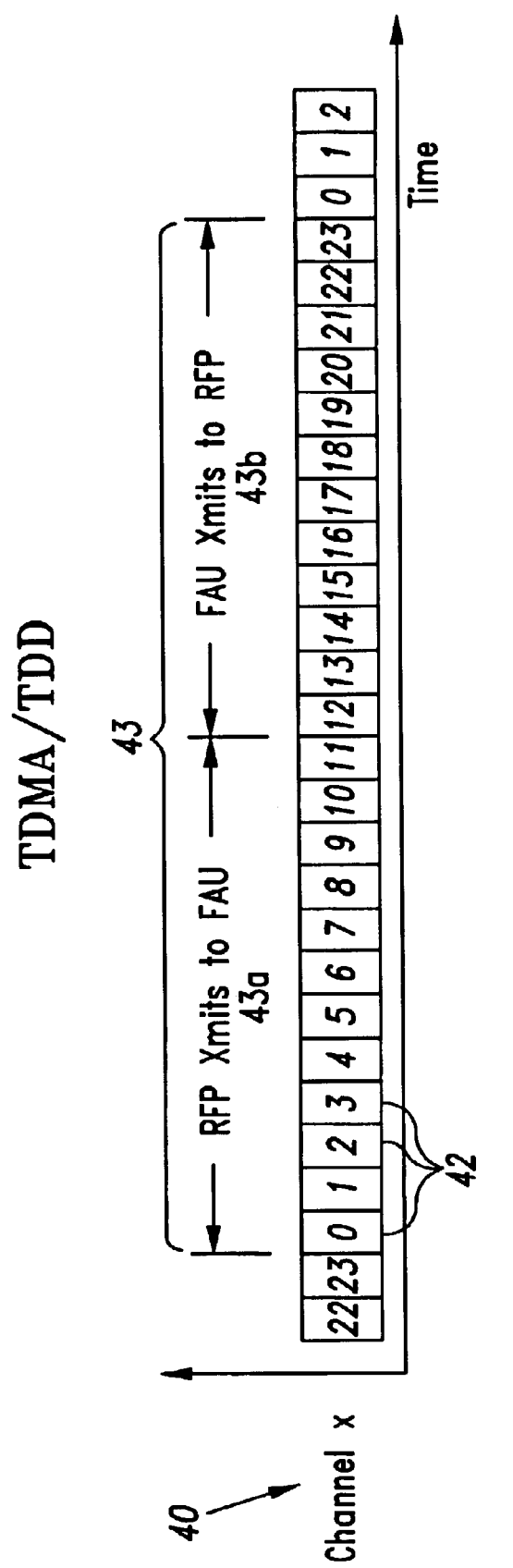
FIG. 3 is a diagrammatic illustration of the TDMA—TDD communication protocol which can be utilized in a wireless local loop communication system.

The communication method of the invention advantageously utilizes the TDMA communication protocol. As illustrated in FIG. 3, TDMA divides a frequency carrier 40 into a predefined repeated sequence of small time slots 42. FIG. 2 illustrates a typical time slot 42. Each time slot 42 gives a communication device the ability to send or receive a certain quantity of data bits, 480 in commonly utilized formats, on a carrier frequency 40 per time slot 42. Since a conversation including a transmission and a reception can use only two time slots 42, a single carrier frequency 40 is capable of conducting a number of calls simultaneously. As depicted in FIG. 2, the time slots 42 are routinely broken down into smaller time slots that can have small portions of data that may be used, for example, for a guard space 44, a synchronization field 46, a signaling field 48, a data field 50, a CRC check field 52 and a sliding interference detection field 54. The exact function of each of these smaller time segments is not important for an understanding of the method of system channel planning and is beyond the scope of this invention.

One method of TDMA that can be used for multiple access wireless communication is TDMA—Time Division Duplex ("TDD") and is shown in graphical form in FIG. 3, which illustrates a frame 43 including a plurality of time slots 42. The TDMA—TDD format would allow a selected radio fixed part 24, 26, 28, 30, 32 or 34 to transmit to an activated fixed access unit 18 in the first plurality of time slots 43a and receive a radio signal from the activated fixed access unit 18 in a second plurality of time slots 43b. This form of communication protocol allows the wireless local loop system to perform duplex communication, in that it allows simultaneous communication in opposite directions over the same carrier frequency without any perceivable time lag.

In FIG. 3, a carrier frequency 40 is illustrated using the TDMA/TDD communication protocol with 24 time slots 42 being utilized for radio communication in frame 43. In preferred embodiments of the invention, each frame can last ten milliseconds and allow each of the 24 time slots 42 to transfer or receive up to 480 bits of information. One skilled in the art would recognize that many variations on the existing setup could be made to conduct wireless communication. As an example, one could use 24 time slots 42 to make up a five-millisecond frame, that allowed each time slot to transfer or receive up to 240 bits of information.

Figure 4:
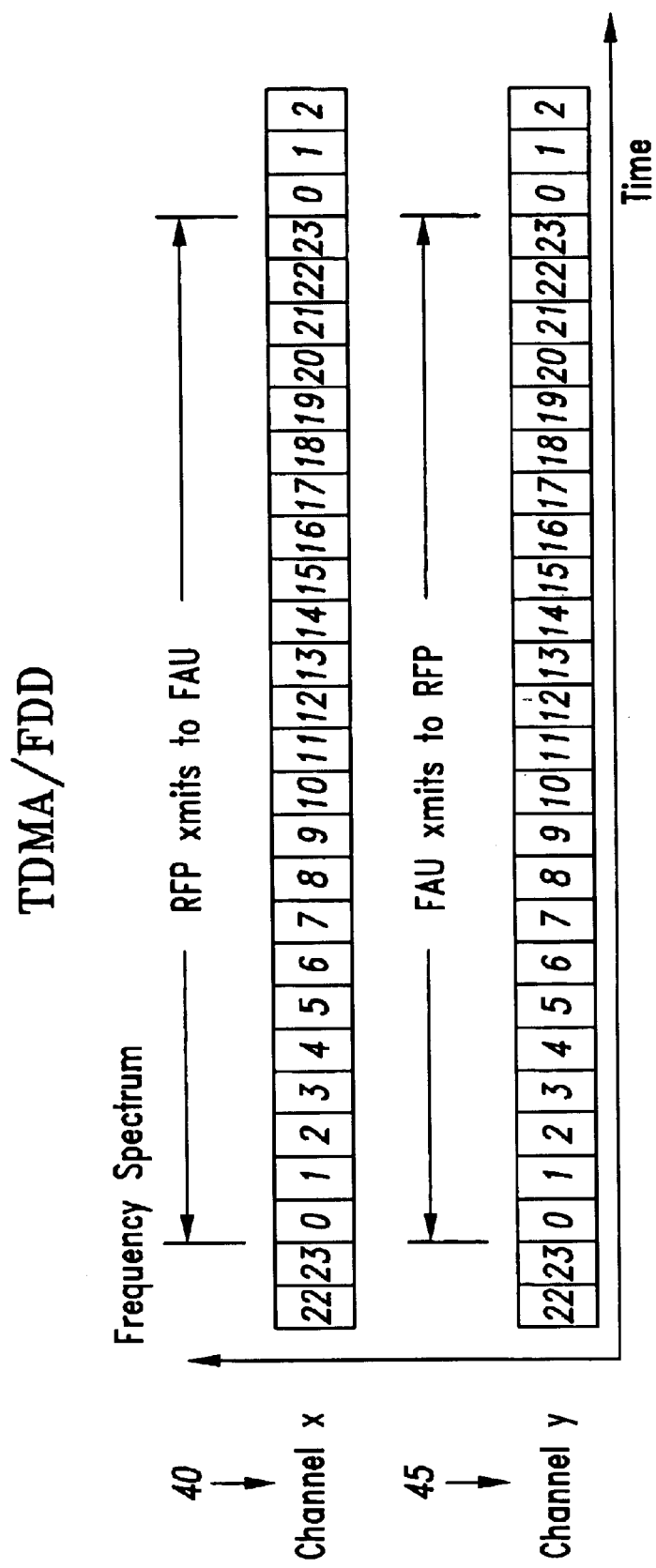
FIG. 4 is a diagrammatic illustration of the TDMA—FDD communication protocol which can be utilized in a wireless local loop communication system.

Another example of conducting radio communication in the TDMA format is depicted in FIG. 4, where an example of TDMA—Frequency Division Duplex ("FDD") is illustrated. In TDMA—FDD, two frequency carriers 40, 45 are utilized to conduct radio communication between a selected radio fixed part 24, 26, 28, 30, 32 or 34 and an activated fixed access unit 18. In preferred embodiments of the invention, a channel from the upper frequency block would be used to transmit signals from the selected radio fixed part 24, 26, 28, 30, 32 or 34 and the activated fixed access unit 18, and a channel from the lower frequency block would be used to receive radio signals transmitted from the activated fixed access unit 18. This form of communication protocol is an example of full-duplex communication, and allows wireless local loop systems 10 to transmit data in both directions simultaneously and continuously.

Figure 5:
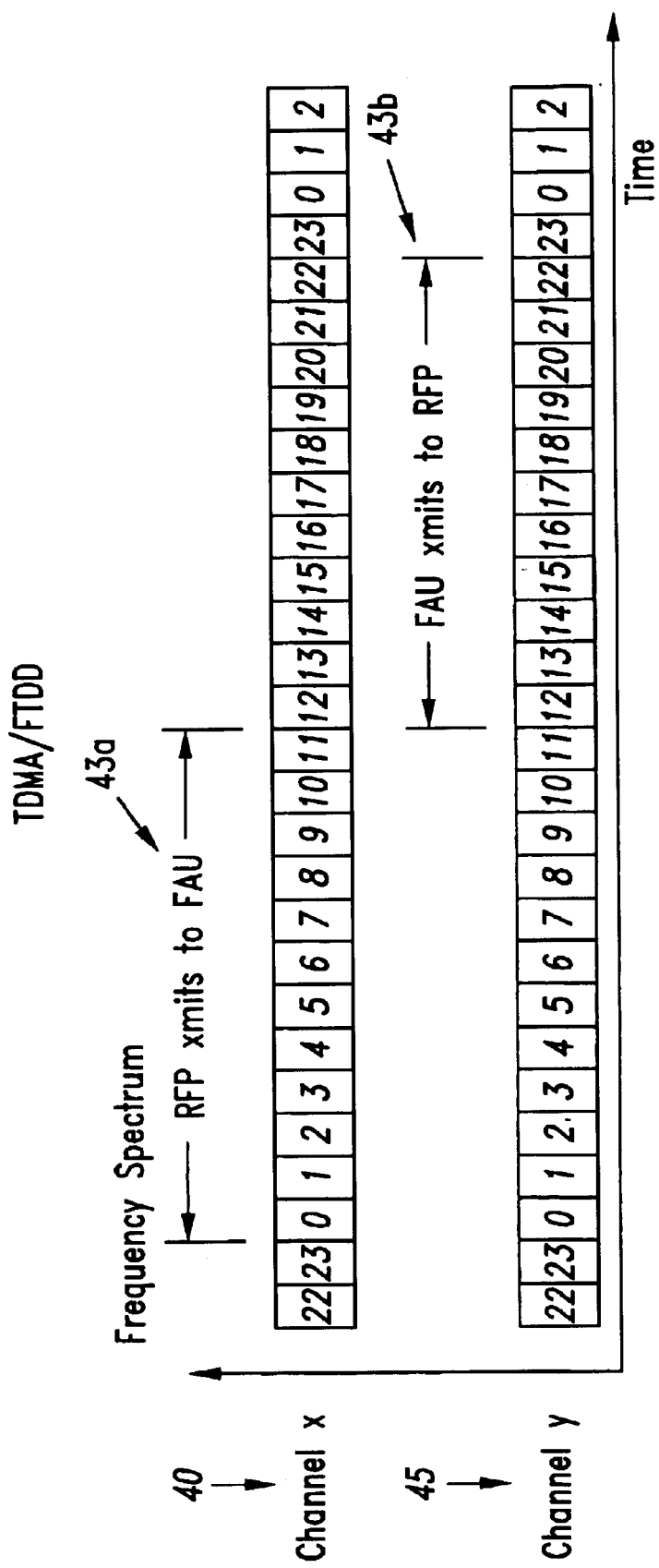
FIG. 5 is a diagrammatic illustration of the TDMA—FTDD communication protocol which can be utilized in a wireless local loop communication system.

A third example of the TDMA communication protocol, known as TDMA—Frequency—Time Division Duplex ("FTDD"), is depicted in FIG. 5. In this form of radio communication, the first carrier frequency 40, located in the upper frequency block in preferred embodiments, utilizes the first twelve time slots 43a of a frame to transmit radio signals from the selected radio fixed part 24, 26, 28, 30, 32 or 34 and the activated fixed access unit 18. The second carrier frequency 45, located in the lower frequency block in preferred embodiments, allows the activated fixed access unit 18 to transmit radio signals to the selected radio fixed part 24, 26, 28, 30, 32 or 34 in the last twelve time slots 43b of the frame 43. This form of communication protocol is another example of full-duplex communication, and allows the wireless local loop system to transmit radio signals in both directions, with a certain time slot offset.

In preferred embodiments of the present invention, the method of controlling radio communication in a wireless local loop communication system comprises the steps of providing a plurality of fixed access units 18 in radio communication with an array of radio fixed parts 24, 26, 28, 30, 32 and 34; utilizing a plurality of radio channels 40 divided into a predetermined number of synchronized time slots 42; conducting radio communication, for example radio transmission or radio reception, between an activated fixed access unit 18 and an activated radio fixed part, for example radio fixed part 30, only during a chosen time slot 42 on an assigned radio channel 40; and denying radio communication on said assigned radio channel 40 during said chosen time slot 42 in a controlled number of the radio fixed parts 24, 26, 28, 32 or 34 surrounding said activated radio fixed part 30 during its communication with said activated fixed access unit 18. In the invention the controlled number of radio fixed parts 24, 26, 28, 32 and 34 in which radio communication is denied during said chosen time slot 42 may include the number of radio fixed parts 24, 26, 28, 32 and 34 that can create radio interference with the radio communication between said activated radio fixed part 30 and said activated fixed access unit 18.

The present method provides multi-channel planning for wireless local loop communication systems 10 by denying radio transmission on an assigned radio channel 40 during a chosen time slot 42 in a controlled number of radio fixed parts 24, 26, 28, 30, 32 and 34 surrounding one or more of the activated radio fixed part 24, 26, 28, 30, 32 and 34. Likewise, the invention provides a method of denying radio reception on an assigned radio channel 40 during another chosen time slot 42 in a controlled number of radio fixed parts 24, 26, 28, 30, 32 or 34 surrounding one ore more of the activated radio fixed parts 24, 26, 28, 30, 32 and 34. Referring once again to FIG. 1A and assuming that radio fixed part 30 has been activated for radio communication, the controlled number of radio fixed parts 24, 26, 28, 32 and 34 surrounding said activated radio fixed part 30 may comprise the adjacent radio fixed parts 28, 32; the second adjacent radio fixed parts 26, 34; and any back-to-back radio fixed parts 24.

Another preferred embodiment of the present invention provides a method of conducting radio communication in a wireless local loop system 10 by providing an array of radio fixed parts 24, 26, 28, 30, 32 and 34 for radio communication with a plurality of fixed access units 18. A plurality of indexed radio frequencies 40 are divided into a plurality of synchronized time slots 42 for conducting radio communication. An activated radio fixed part 30 and an activated fixed access unit 18 then utilize an assigned pair of time slots 42 on a selected indexed radio frequency 40 to transfer and receive information. During radio communication, which may be either transmission or reception, between the activated radio fixed part 30 and the activated fixed access unit 18, radio transmission in the assigned pair of time slots 42 on the selected indexed radio frequency 40 is disallowed in the adjacent radio fixed parts 28, 32.

The method of radio communication may also disallow radio transmission in the assigned pair of time slots 42 on the selected indexed radio frequency 40 in the second adjacent radio fixed parts 26,34 during radio transmission between the activated radio fixed part 30 and the activated fixed access unit 18. In addition, radio transmission may be disallowed in the assigned pair of time slots 42 on the selected indexed radio frequency 40 in back to back radio fixed parts 24 during radio transmission between the activated radio fixed part 30 and the activated fixed access unit 18. Therefore, during radio transmission between an activated radio fixed part 30 and an activated fixed access unit 18, the method can disallow radio transmission in any or all of the radio fixed parts 24, 26, 28, 32, 34 surrounding an activated radio fixed part 30.

In addition to disallowing radio transmission in the assigned time slot 42, the method of system channel planning can also disallow radio reception in any or all of the radio fixed parts 24, 26, 28, 32, 34 surrounding the activated radio fixed part 30. This means that radio reception in adjacent radio fixed parts 28, 32, in the second adjacent radio fixed parts 26, 34 and in back-to-back radio fixed parts 24 can be disallowed during reception of a radio signal from the activated radio fixed part 18.

The present invention provides a method of conducting radio communication in a wireless local loop, that comprises the steps of providing an array of radio fixed parts 24, 26, 28, 30, 32 and 34 in radio communication with a plurality of fixed access units 18; dividing a plurality of radio channels 40 into a predetermined number of synchronized time slots 42 for conducting radio communication between an activated fixed access unit 30 and an activated radio fixed part 18; denying radio transmission in a selected time slot 42 on an assigned radio channel 40 in a predetermined number of radio fixed parts 24, 26, 28, 32 or 34 that may interfere with the activated radio fixed part 30 during transmission of a radio signal to the activated fixed access unit 18; and denying radio reception in said selected time slot 42 on the assigned radio channel 40 in the predetermined number of radio fixed parts 24, 26, 28, 32 or 34 surrounding the activated radio fixed part 30 while receiving a radio signal from the activated fixed access unit.

The predetermined number of radio fixed parts 24, 26, 28, 32 or 34 that are not allowed to transmit or receive may comprise the adjacent radio fixed parts 28, 32, the second adjacent radio fixed parts 26, 34 and the back-to-back radio fixed part 24. The method may also be utilized using one of the channels of an upper frequency band of radio channels for sending radio signals from the activated radio fixed part 30 to the activated fixed access unit 18. A channel from the lower frequency band may then be utilized to receive radio signals from the activated fixed access unit 18. Of course, one radio channel 42 can be used to conduct radio communication between the activated radio fixed part 30 and the activated fixed access unit 18.

The present invention includes a wireless local loop communication system 10, comprising a plurality of fixed access units 18 in radio communication with an array of radio fixed parts 24, 26, 28, 30, 32 and 34. The system utilizes a plurality of radio channels 40 divided into a predetermined number of synchronized time slots 42. A control unit 16 is connected with said array of radio fixed parts 24, 26, 28, 30, 32 and 34 for denying radio transmission on an assigned radio channel 40 during a chosen time slot 42 in a controlled number of radio fixed parts 24, 26, 28, 32 or 34 surrounding an activated radio fixed part 30 during transmission of a radio signal to an activated fixed access unit 18.

The wireless local loop communication system 10 may also utilize the control unit 16 to deny radio reception on said assigned radio channel 40 during said chosen time slot 42 in a controlled number of radio fixed parts 24, 26, 28, 32 and 34 surrounding said activated radio fixed part 30 during transmission of a radio signal to said activated fixed access unit 18. The controlled number of radio fixed parts surrounding said activated radio fixed part 30 may comprise the adjacent radio fixed parts 28, 32, the second adjacent radio fixed parts 26, 34 and the back-to-back radio fixed part 24.

Although several preferred embodiments of this invention have been disclosed, one skilled in the art would recognize that the disclosed methods can be utilized in numerous types of communication systems. It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents that are intended to define the spirit and scope of this invention.

What is claimed is:

1. A method of conducting radio communication in a wireless local loop communication system including a plurality of fixed access units in radio communication with an array of radio fixed parts, comprising the steps of:

utilizing a plurality of radio channels divided into a predetermined number of synchronized time slots;

conducting radio communication between an activated fixed access unit and an activated radio fixed part during a chosen time slot on an assigned radio channel; and denying radio communication on said assigned radio channel during said chosen time slot in a controlled number of radio fixed parts surrounding said activated radio fixed parts.

2. The method of claim 1 wherein said radio communication may comprise either radio transmission or radio reception.

3. The method of claim 1 wherein said controlled number of radio fixed parts surrounding said activated radio fixed parts comprises the adjacent radio fixed parts.

4. The method of claim 1 wherein said controlled number of radio fixed parts surrounding said activated radio fixed parts comprises the second adjacent radio fixed parts.

5. The method of claim 1 wherein said controlled number of radio fixed parts comprises radio fixed parts back to back with said activated radio fixed part.

6. The method of claim 1 further comprising the step of utilizing an upper frequency band to transmit from said array of radio fixed parts to said plurality of fixed access units.

7. The method of claim 1 further comprising the step of utilizing a lower frequency band to transmit from said plurality of fixed access units to said array of radio fixed parts.

8. A method of multi-channel planning for a wireless local loop communication system, comprising the steps of:

providing an array of radio fixed parts for conducting radio communication with a plurality of fixed access units;

supplying a plurality of indexed radio frequencies divided into a plurality of synchronized time slots;

utilizing an activated radio fixed part and an activated fixed access unit for radio communication in an assigned time slot on a selected indexed radio frequency; and disallowing radio communication in said assigned time slot on said selected indexed radio frequency in the surrounding radio fixed parts.

9. The method of claim 8 wherein said radio communication comprises either radio transmission or radio reception.

10. The method of claim 8 wherein the surrounding radio fixed parts comprises the adjacent radio fixed parts.

11. The method of claim 8 wherein the surrounding radio fixed parts comprises the second adjacent radio fixed parts.

12. The method of claim 8 wherein the surrounding radio fixed parts comprises the radio fixed parts facing said activated radio fixed part back to back.

13. The method of claim 8 further comprising communicating between the wireless local loop system and a public switched telephone network via a radio access node control chamber connected with a public switched telephone network hub.

14. The method of claim 8 further comprising the step of utilizing an indexed upper frequency band to transmit signals from said array of radio fixed parts to said plurality of fixed access units.

15. The method of claim 8 further comprising the step of utilizing an indexed lower frequency band to transmit signals from said plurality of fixed access units to said array of radio fixed parts.

16. The method of claim 8 further comprising the step of utilizing one of said indexed radio frequencies to handle two-way communication between said activated fixed access unit and said activated radio fixed part.

17. A wireless local loop communication system, comprising:
- a plurality of fixed access units in radio communication with an array of radio fixed parts;
- a plurality of radio channels divided into a predetermined number of synchronized time slots;
- a control unit connected with said array of radio fixed parts for denying radio communication on an assigned radio channel during a chosen time slot in a controlled number of radio fixed parts surrounding an activated radio fixed part.

18. The wireless local loop communication system of claim 17 wherein said radio communication comprises radio transmission and radio reception.

19. The wireless local loop communication system of claim 17 wherein said controlled number of radio fixed parts surrounding said activated radio fixed part comprises the adjacent radio fixed parts.

20. The wireless local loop communication system of claim 17 whrein said controlled number of radio fixed parts surrounding said activated radio fixed part comprises the second adjacent radio fixed parts.

21. The wireless local loop communication system of claim 17 wherein said controlled number of radio fixed parts surrounding said activated radio fixed part comprises the radio fixed part facing said activated radio fixed part back to back.

22. The wireless local loop communication system of claim 17 wherein said controlled number of radio fixed parts surrounding said activated radio fixed part comprises all the radio fixed parts except said activated radio fixed part.

23. The wireless local loop communication system of claim 17 wherein said control unit is connected with a public switched telephone network.

* * * * *